United States Patent Office 3,444,297
Patented May 13, 1969

3,444,297
13β-n-PROPYL-17α-ETHYNYL-Δ$^{4,9}$-GONADIEN-17β-
OL-3-ONE, ITS PREPARATION AND USE
Gerard Nomine, Noisy-le-Sec, Robert Bucourt, Clichy-
Sous-Bois, Andre Pierdet, Noisy-le-Sec, and Candido
Snozzi, Maison-Alfort, France, assignors to Roussel-
Uclaf, S.A., Paris, France, a corporation of France
No Drawing. Filed June 21, 1962, Ser. No. 204,057
Claims priority, application France, Oct. 12, 1961,
875,782; July 6, 1961, 867,160
Int. Cl. A61k 17/08; C07c 169/22
U.S. Cl. 424—243    13 Claims The present invention relates to a new derivative of gonadiene, particularly, 13β - n-propyl-17α-ethynyl-Δ$^{4,9}$-gonadien-17β-ol-3-one having the formula:

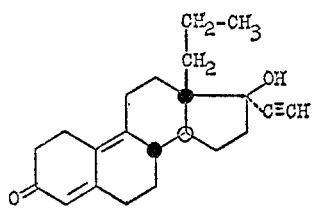

its process of preparation and its pharmacological use in inhibiting hypophysial secretion. The invention also relates to intermediates useful in the production of the derivative of gonadiene.

13β - n - propyl-17α-ethynyl-Δ$^{4,9}$-gonadien-17β-ol-3-one has a steric configuration which corresponds to that of the natural steroid products and is possessed with useful physiological properties. It has, in particular, a remarkable hypophysial inhibitory action against the oversecretion of folliculo-stimulating gonadotropic hormones (F.S.H. factor).

The invention has as its object the production of 13β-n-propyl-17α-ethynyl-Δ$^{4,9}$-gonadien-17β-ol-3-one.

The invention also has for its object the development of a process for the production of 13β-n-propyl-17α-ethynyl-Δ$^{4,9}$-gonadien-17β-ol-3-one which comprises the steps of (a) Reacting a compound having the formula:

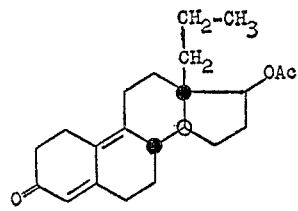

where Ac represents the acyl radical of an organic carboxylic acid having from 1 to 18 carbon atoms with a ketalizing agent, (b) Saponifying the ketal in the 3 position having the formula:

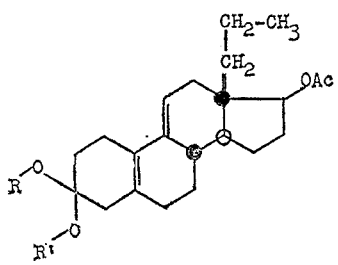

wherein Ac has the above assigned values and R and R' represent radicals selected from the group consisting of lower alkyl and, when taken together, lower alkylene, by the action of an alkaline agent, (c) Reacting the alcohol having the formula:

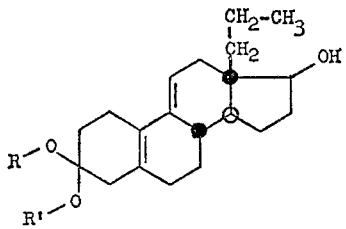

wherein R and R' have the above-assigned values, with an oxidizing agent, (d) Ethynylating the ketone having the formula:

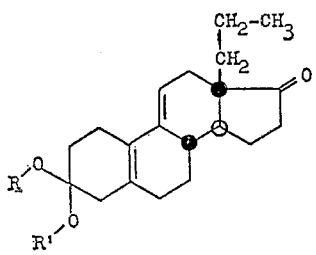

where R and R' have the above-assigned values, by the action of an ethynylating agent, (e) Subjecting the ethynyl compound having the formula:

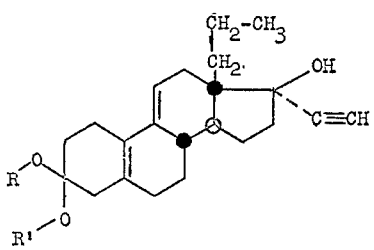

where R and R' have the above-assigned values, to an acid hydrolysis and (f) Recovering said 13β - n - propyl - 17α - ethynyl-α-ethynyl-Δ$^{4,9}$-gonadien-17β-ol-3-one.

Another object of the invention is the production of therapeutic compositions comprising 13β-n-propyl-17α-ethynyl - Δ$^{4,9}$ - gonadien - 17β-ol-3-one and a non-toxic excipient.

A further object of the invention is the process of inhibiting hypophysial action which comprises administering from about 2 mg. to about 20 mg. per day of 13β-n-propyl-17α-ethynyl-Δ$^{4,9}$-gonadien-17β-ol-3-one. A still further object of the invention is the production of the following intermediates:

(1) Compounds having the formula:

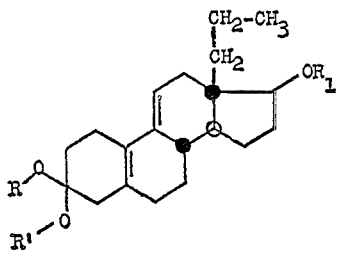

wherein R$_1$ is selected from the group consisting of hydrogen and the acyl radical of an organic carboxylic acid having from 1 to 18 carbon atoms and R and R' represent radicals selected from the group consisting of lower alkyl and, when taken together, lower alkylene, and preferably 3-ethylenedioxy-13β-n-propyl-17β-benzoyloxy-$\Delta^{5(10),9,(11)}$-gonadiene and 3-ethylenedioxy-13β-n-propyl-$\Delta^{5(10),9,(11)}$-gonadien-17β-ol.

(2) Compounds having the formula:

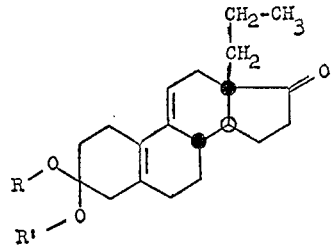

wherein R and R' represent radicals selected from the group consisting of lower alkyl and, when taken together, lower alkylene, and preferably 3-ethylenedioxy-13β-n-propyl-$\Delta^{5(10),9(11)}$-gonadien-17-one.

(3) Compounds having the formula:

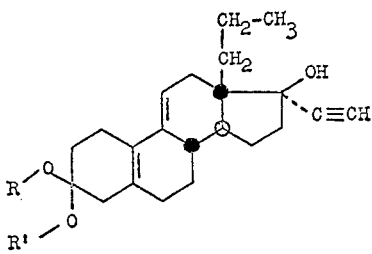

wherein R and R' represent radicals selected from the group consisting of lower alkyl and, when taken together, lower alkylene, and preferably 3-ethylenedioxy-13β-n-propyl-17α-ethynyl-$\Delta^{5(10),9(11)}$-gonadien-17β-ol.

These and other objects of the invention will become more apparent as the description thereof proceeds.

The process, which has been outlined above, in the objects of the invention is shown by the flow diagram of Table I.

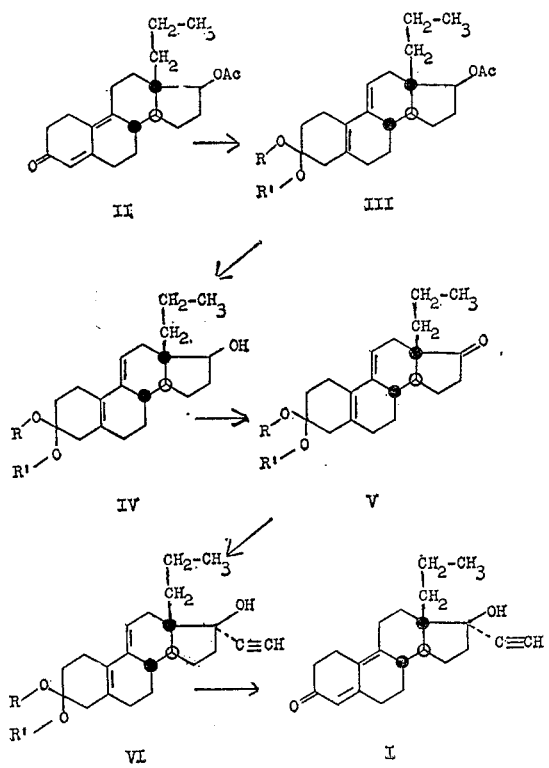

Ac represents the acyl radical of an organic carboxylic acid having 1 to 18 carbon atoms, R and R' represent lower alkyl or, when taken together, lower alkylene.

The process of the invention, the preparation of 13β-n-propyl-17α-ethynyl - $\Delta^{4,9}$ - gonadien-17β-ol-3-one, consists essentially in that the ketone function of 13β-n-propyl-17β-acyloxy-$\Delta^{4,9}$-gonadien-3-one, II, in the 3 position is shielded in the form of a ketal, III; the 17β-acyloxy group of compound III is saponified by an alkaline agent into the ketal of 13β-n-propyl-$\Delta^{4,9}$-gonadien-17β-ol-3-one, IV; which is transformed with the aid of an oxidant into the corresponding 17-ketone, V; when this compound is subjected to the action of an ethynylation agent the ketal of 13β-n-propyl-17α-ethynyl-$\Delta^{4,9}$-gonadien-17β-ol-3-one, VI, is obtained; which is subjected to an acid hydrolysis to obtain the desired product.

The process of the invention is preferably carried out by (a) utilizing 13β-n-propyl-17β-benzoyloxy-$\Delta^{4,9}$-gonadien-3-one as the starting material, (b) reacting this compound with a ketalizing agent such as a lower alkanol, a lower alkanediol or a ketal derivative thereof, for example, methylethyl dioxolane in the presence of a strong acid catalyst such as p-toluene sulfonic acid at reflux temperatures, (c) saponifying the ketal, III, with a lower alkanolic solution of an alkali metal hydroxide, for example methanolic potassium hydroxide at reflux temperatures, (d) oxidizing with an exchangeable ketone in the presence of an aluminum lower alkanolate, such as cyclohexanone in the presence of aluminum isopropylate, in an inert organic solvent such as anhydrous toluene at reflux temperatures, (e) ethynylating the 17-ketone, V, with an ethynylmagnesium halide such as the bromide in an inert organic solvent such as tetrahydrofuran at reflux temperatures, and (f) hydrolyzing the 17α-ethynyl compound, VI, by the action of a strong mineral acid in an organic carboxylic acid, such as perchloric acid in solution in acetic acid.

By the term "gonane" and its variations, such as "gonene," etc., we mean a compound having fully hydrogenated cyclopentanophenanthrene nucleus and having the steric configuration of the natural steroids. The compounds so named could also be called 18,19-di-norandrostanes.

In addition to the benzoic acid ester, other esters with organic carboxylic acids having from 1 to 18 carbon atoms, such as the alkanoates and alkenoates, for example, the acetate, the trimethylacetate, the propionate, the 4,4-dimethylpentanoate, the 10-undecenoate; the cycloalkylalkanoates, for example, the β-cyclopentyl-propionate; the arylalkanoates, for example, the phenyl-propionate; the cycloalkanoates, for example, the hexahydrobenzoate, the hexahydroterephthalate and phenyl-carboxylic acids, for example the 3,5-dinitrobenzoate, may also be prepared without departing from the scope of the invention.

As stated previously, 13β-n-propyl-17α-ethynyl-$\Delta^{4,9}$-gonadien-17β-ol-3-one possesses interesting pharmocological properties. Notably, it has a remarkable hypophysial inhibitory action against the secretion of folliculo-stimulating gonadotropic hormones.

It may be used in the treatment of hypophysial over-secretion of the F.S.H. factor (folliculo-stimulating gonadotropic hormone) caused by castration or by menopause. This compound has the advantage of having, in addition to hypophysial inhibitory action, only a very attenuated androgenic or estrogenic hormonal action. It can therefore be administered for prolonged periods without fear of adverse secondary effects.

13β-n-propyl-17α-ethynyl = $\Delta^{4,9}$ - gonadien-17β-ol-3-one can be administered orally, perlingually, transcutaneously or rectally. It may be prepared in the form of injectable solutions or suspensions, packed in ampoules or in multiple-dose flacons; in the form of implants; tablets; and suppositories.

The useful dosology is controlled between 2 and 20 mg. per day in the adult as a function of the method of administration.

The pharmaceutical forms, such as injectable solutions and suspensions, tablets and suppositories are prepared according to the usual methods.

The following examples are illustrative of the invention. They are not, however, to be construed as limitative. It is obvious that other expedients known to the art may be employed.

EXAMPLE I

Preparation of 13β-n-propyl-17α-ethynyl-Δ$^{4,9}$-gonadien-17β-ol-3-one, I.

Step A.—Ketalization of 13β-n-propyl-17β-benzoyloxy - Δ$^{4,9}$ - gonadien-3-one (II; Ac=COC$_6$H$_5$).—2 g. of 13β-n-propyl-17β-benzoyloxy-Δ$^{4,9}$-gonadien-3-one, II, melting at 166° C. and having a specific rotation $[\alpha]_D^{20}$=—108.5° (methanol) (obtained according to Velluz et al., Tetrahedron Letters, No. 3, March 1961, pp. 127–130), were introduced into 40 cc. of methylethyl dioxolane and 40 mg. of p-toluene sulfonic acid. This mixture was heated to reflux temperature for a period of two hours. After cooling the reaction mixture was poured into a dilute solution of sodium bicarbonate. The aqueous phase was extracted with ether. The extracts were combined and evaporated to dryness. A residue was obtained consisting of 3-ethylenedioxy-13β-n-propyl-17β-benzoyloxy-Δ$^{5(10),9(11)}$-gonadiene (III; Ac=COC$_6$H$_5$, R+R'=C$_2$H$_4$), which was used as such for the next step of the synthesis.

This compound is not described in the literature.

Step B.—Saponification of 3-ethylenedioxy-13β-n-propyl-17β-benzoyloxy-Δ$^{5(10),9(11)}$-gonadiene, III.—2.29 g. of 3-ethylenedioxy-13β-n-propyl - 17β - benzoyloxy-Δ$^{5(10),9(11)}$-gonadiene, III, obtained according to the preceding step, were dissolved in a mixture of 42 cc. of methanol and 11 cc. of a 10% solution of potassium hydroxide in methanol. The mixture was heated to reflux under a nitrogen atmosphere for a period of three hours and forty-five minutes. The solution was then concentrated to a small volume, poured in water, and extracted with ether. The extracts were combined, washed with water, dried and evaporated to dryness under vacuum. The residue was subjected to chromatography through silica gel which furnished 3-ethylenedioxy-13β-n-propyl-Δ$^{5(10),9(11)}$-gonadien-17β-ol (IV; R+R'=C$_2$H$_4$).

This compound is not described in the literature.

Step C.—Oxidation of 3-ethylenedioxy-13β-n-propyl-Δ$^{5(10),9(11)}$-gonadien-17β-ol, IV.—1.5 g. of 3-ethylenedioxy-13β-n-propyl-Δ$^{5(10),9(11)}$-gonadien-17β-ol, IV, obtained according to the preceding step, were introduced into a mixture of 25 cc. of cyclohexanone and 200 cc. of anhydrous toluene. The mixture was heated to boiling and in the space of two and a half hours 1.26 g. of aluminum isopropylate in solution in 115 cc. of anhydrous toluene were added. The refluxing was continued for another half-hour. The mixture was then cooled and a solution of 4.5 g. of potassium carbonate and 9 g. of mixed sodium-potassium tartrate in 90 cc. of water were added. The mixture formed was subjected to a steam distillation for a period of two hours. After cooling the residue was extracted with ether. The extracts were washed with water and evaporated to dryness under vacuum.

The residue was subjected to chromatography through silica gel and eluted with methylene chloride, 3-ethylenedioxy - 13β - n - propyl-Δ$^{5(10),9(11)}$-gonadiene-17-one (V; R+R'=C$_2$H$_4$) was obtained, which was used as such for the next step of the synthesis.

This compound is not described in the literature.

Step D.—Ethynylation of 3-ethylenedioxy-13β-n-propyl-Δ$^{5(10),9(11)}$-gonadiene-17-one, V.—A stream of methyl bromide was bubbled into a suspension of 12.5 g. of magnesium in 200 cc. of anhydrous ether maintained at reflux temperature.

270 cc. of tetrahydrofuran were added to 120 cc. of the solution of magnesium compound thus obtained and acetylene was bubbled therethrough for three hours.

A solution of ethynylmagnesium bromide was obtained into which were introduced 1.26 g. of 3-ethylenedioxy-13β-n-propyl-Δ$^{5(10),9(11)}$-gonadiene-17-one, V, obtained according to the preceding step, in solution in 40 cc. of tetrahydrofuran. Nitrogen was bubbled through the mixture while it was heated to reflux for a period of two hours. On cooling 150 cc. of a saturated solution of ammonium chloride were added. The mixture was then poured into water and extracted with ether.

Evaporation of the ethereal extract produced a residue which was subjected to chromatography through silica gel. 3 - ethylenedioxy - 13β - n- propyl-17α-ethynyl-Δ$^{5(10),9(11)}$-gonadiene-17β-ol (VI; R+R'=C$_2$H$_4$) was obtained.

This compound is not described in the literature.

Step E.—Hydrolysis of the ketals.—1.162 of 3-ethylenedioxy-13β-n-propyl-17α-ethynyl - Δ$^{5(10),9(11)}$ - gonadien-17β-ol, VI, obtained according to the preceding step, were dissolved in 27 cc. of a solution of 4 cc. of 65% perchloric acid in 40 cc. of acetic acid. The solution was agitated and then allowed to stand at room temperature for thirty minutes. The resultant solution was then poured in water saturated with sodium bicarbonate.

13β-n-propl - 17α - ethynyl-Δ$^{4,9}$-gonadiene-17β-ol-3-one, I, precipitated. It was purified by subjecting it to chromatography through silica gel and a product was obtained melting at 159–160° C. and having a specific rotation $[\alpha]_D^{20}$=—310° (c.=0.4% in ethanol). The product occurred in the form of white crystals, soluble in alcohol, ether, acetone and chloroform, slightly soluble in benzene, and insoluble in water and aqueous solvents.

*Analysis.*—C$_{22}$H$_{28}$O$_2$; molecular weight=324.44. Calculated: C, 81.44%; H, 8.70%. Found: C, 81.2%; H, 8.7%.

U.V. spectra (in ethanol):

$$\lambda_{max}.\ 304\text{–}305\ m\mu\ E\ {}^{1\%}_{1\,cm.}\ =585,\ \epsilon=18,950$$

This compound is not described in the literature.

EXAMPLE II

Pharmacological study of 13β-n-propyl-17α-ethynyl-Δ$^{4,9}$-gonadiene-17β-ol-3-one, I (1) *Hypophysical inhibitory action.*—This action was studied on thirty-day old female rats of the same litter, joined in parabiotic union according to the method described by Bunster et al., Anat. Rec., 1933, 57, 339. One of the subjects was castrated and treated the same day for ten days thereafter with a daily dose of 200γ of 13β-n-propyl-17α-ethynyl-Δ$^{4,9}$-gonadiene-13β-ol-3-one administered orally.

Some of the parabiotically joined animals (an untreated castrated rat united with a whole rat) served as controls.

The animals were killed on the eleventh day after the parabiotic union. The ovaries were extracted and weighed.

This test of parabiosis allows a quantitative appraisal of the increase of hypophysial gonadotropic activity of the castrated subject by measuring the weight of the ovaries of the intact partner. The activity of the product under study was evaluated by the inhibition of hypertrophy of the gonads.

The following table shows the results obtained after treatment with the 13β-n-propyl-17α-ethynyl-Δ$^{4,9}$-gonadien-17β-ol-3-one in comparison with the control and in comparison with an equal dose of 17α-ethynyl-Δ$^{4,9}$-estradien-17β-ol-3-one (Perelman et al., J.A.C.S., 1960, 82, 2402–3).

The average weight of the ovaries of the castrated rats is the average weight of the ovaries weighed on the day of castration, which is to say, at the beginning of the experiment.

TABLE II

| Treatment | Period of treatment in days | Weights of ovaries in intact subjects (mg.) | Weights of ovaries in castrated subjects (mg.) |
|---|---|---|---|
| Controls | | 148 | 17 |
| 13β-n-propyl-17α-ethynyl-Δ⁴,⁹-gonadien-17β-ol-3-one | 10 | 17 | |
| 17α-ethynyl-Δ⁴,⁹-estradien-17β-ol-3-one | 10 | 23 | |

A comparison of the average weight of the ovaries of the castrated rats taken as the reference weight of the ovaries at the start of the experiment, and the ovaries of the intact rats at the conclusion of the experiment shows that there has been no increase in the weight of this organ for the lot treated with the 13β-n-propyl-17α-ethynyl-Δ$^{4,9}$-gonadien-17β-ol-3-one; whereas in the control pairs the average weight of the ovaries of the intact subjects is, at the end of the experiment, equal to 148 mg. and in those treated with 17α-ethynyl-Δ$^{4,9}$-estradien-17β-ol-3-one, at the end of the experiment the average weight of the ovaries was 23 mg.

It may then be concluded that the hypophysial over-secretion of F.S.H. factor due to castration is completely inhibited by 13β-n-propyl-17α-ethynyl-Δ$^{4,9}$-gonadien-17β-ol-3-one, which, in addition, is more active as an inhiibtor than 17α-ethynyl-Δ$^{4,9}$-estradien-17β-ol-3-one.

(2) Determination of the estrogenic action.—The estrogenic action of 13β - n - propyl - 17α - ethynyl-Δ$^{4,9}$-gonadien-17β-ol-3-one was determined by the Allen-Doisy test as described by Madame Feyel-Cabanes, C. R. Soc. Biol. 1956, 150, 1881.

The testing of estrogenic action was effected on a number of castrated female rats weighing about 140 g.±20 g., divided into groups of four. Each rat received orally a single administration of 13β-n-propyl-17α-ethynyl-Δ$^{4,9}$-gonadien-17β-ol-3-one in a dose of 1 mg. This dose was the minimum dose capable of causing the appearance of estrus in a period of one day in an isolated rat. The rat unit for this compound is thus at least 1 mg.

It is to be understood that the invention is not limited to the specific embodiments and other expedients may be employed without departing from the spirit of the invention and the scope of the appended claims.

We claim:
1. 13β - n - propyl - 17α - ethynyl - Δ$^{4,9}$-gonadien-17β-ol-3-one.
2. Compounds having the formula:

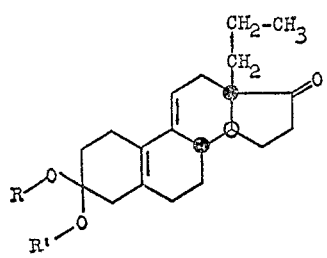

wherein R and R' taken together represent lower alkylene.
3. 3 - ethylenedioxy-13β-n-propyl-Δ$^{5(10),9(11)}$-gonadien-17-one.

4. Compounds having the formula:

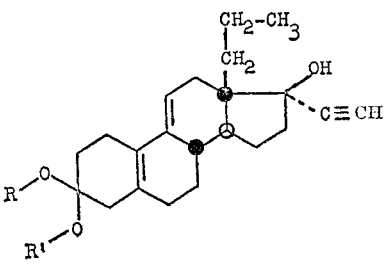

wherein R and R' taken together represent lower alkylene.
5. 3 - ethylenedioxy - 13β - n- propyl - 17α - ethynyl-Δ$^{5(10),9(11)}$-gonadien-17β-ol.
6. A process for the production of 13β-n-propyl-17α-ethynyl-Δ$^{4,9}$-gonadien-17β-ol-3-one which comprises the steps of:
(a) Reacting a compound having the formula:

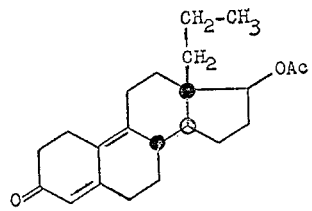

where Ac represents the acyl radical of an organic carboxylic acid having from 1 to 18 carbon atoms with a ketalizing agent selected from the group consisting of lower alkanediols and ketal derivatives thereof,
(b) Saponifying the ketal in the 3 position having the formula:

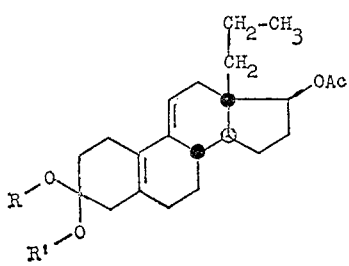

wherein Ac has the above assigned values and R and R' taken together represent lower alkylene, by the action of a lower alkanolic solution of an alkali metal hydroxide,
(c) Reacting the alcohol having the formula:

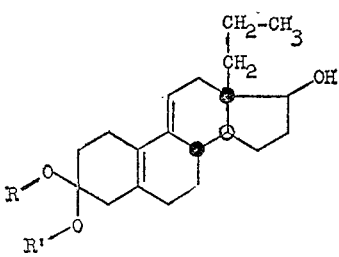

wherein R and R' have the above assigned values, with cyclohexanone in the presence of aluminum isopropylate, (d) Ethynylating the ketone having the formula:

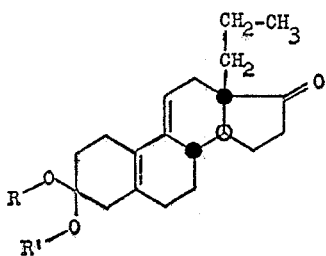

where R and R' have the above assigned values, by the action of an ethynylmagnesium halide in an inert organic solvent at reflux temperatures, (e) Subjecting the ethynyl compound having the formula:

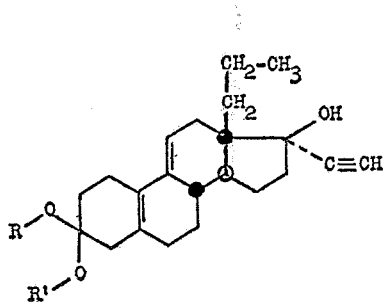

where R and R' have the above assigned values, to an acid hydrolysis by the action of a strong mineral acid in an organic carboxylic acid and (f) Recovering said 13β - n - propyl - 17α-ethynyl-Δ$^{4,9}$-gonadien-17β-ol-3-one.

7. The process of claim 6 wherein the starting compound is 13β - n - propyl - 17β-benzoyloxy-Δ$^{4,9}$-gonadien-3-one.

8. The process of claim 6 wherein the ethylene ketal of 13β-n-propyl-17β-acyloxy-Δ$^{4,9}$-gonadien-3-one is obtained by action thereon of methylethyl dioxolane.

9. The process of claim 6 wherein said lower alkanolic solution of an alkali metal hydroxide used in (b) is a methanolic solution of potassium hydroxide.

10. The process of claim 6 wherein said ethynylmagnesium halide used in (d) is ethynylmagnesium bromide.

11. The process of claim 6 wherein said acid hydrolysis in (e) is brought about with the aid of aqueous perchloric acid in an acetic acid media.

12. Therapeutic compositions comprising 13β-n-propyl-17α-ethynyl-Δ$^{4,9}$-gonadien-17β-ol-3-one and a nontoxic excipient.

13. The process of inhibiting hypophysial action which comprises administering from about 2 mg. to about 20 mg. per day of 13β-n-propyl-17α-ethynyl-Δ$^{4,9}$-gonadien-17β-ol-3-one.

References Cited
UNITED STATES PATENTS
3,069,421  12/1962  Nomine et al. _____ 260—239.55

HENRY A. FRENCH, Primary Examiner.

U.S. Cl. X.R.

260—239.55, 397.4, 397.45, 397.5, 999; 424—238, 242